Oct. 10, 1933.     H. BECKER     1,930,190

ROLLER BEARING

Filed Oct. 20, 1930     2 Sheets-Sheet 1

Inventor:
Heinrich Becker
By B. Singer, atty.

Oct. 10, 1933.　　　H. BECKER　　　1,930,190
ROLLER BEARING
Filed Oct. 20, 1930　　　2 Sheets-Sheet 2

Inventor:
Heinrich Becker
By B. Singer, Atty.

Patented Oct. 10, 1933

1,930,190

UNITED STATES PATENT OFFICE 1,930,190

ROLLER BEARING

Heinrich Becker, Hattingen-on-the-Ruhr, Germany

Application October 20, 1930, Serial No. 490,031, and in Germany October 23, 1929

1 Claim. (Cl. 308—180)

By running the rollers for the taking up of axially directed forces with their peripheral faces against a collar provided on the shaft, in roller bearings formed for taking up the radial pressures, an inaccurate rolling action occurs by making the annular surface which comes into play of a larger width as it is necessary to take the forces without non-permissible local surface pressure. This is due to the fact that the speed at the external radius of this annular surface is considerably larger than at the inner radius and hence friction losses and a corresponding wear are involved. If, on the other hand, this annular surface is made so narrow that this irregular rolling action is limited, there is a possibility of local excess stresses, readily occurring in the narrow supporting surface of the solid rollers or shaft respectively, particularly in the case of shocks set up in axial direction, so that the functioning of the bearing can also be disturbed.

According to the present invention helically wound rollers of band steel having their convolutions spaced apart to afford clearance between the convolutions are employed, so that said rollers function as thrust bearing elements as well as radial bearing elements and the convolutions forming the ends of the rollers are welded together to provide the rollers with solid inelastic ends. Also the outer opposing annular surface against which the helically wound rollers bear is presented by an elastic bush which cooperates with the rollers in yieldably resisting axial stresses, as hereinafter more fully described.

Figure 1:
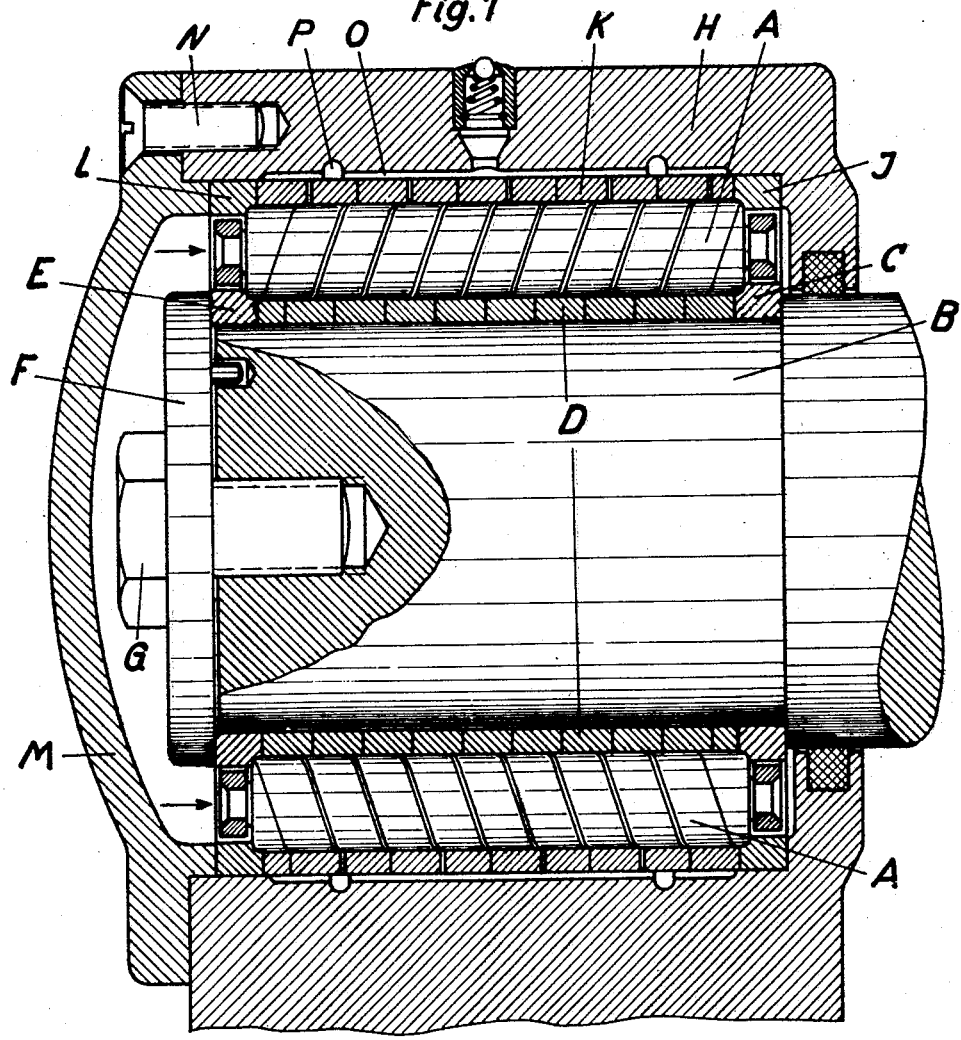
Figure 2:
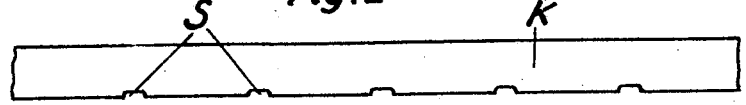
Figure 3:
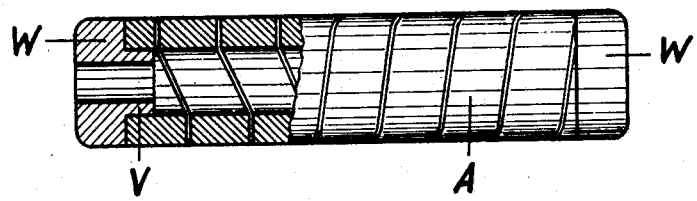
Figure 4:
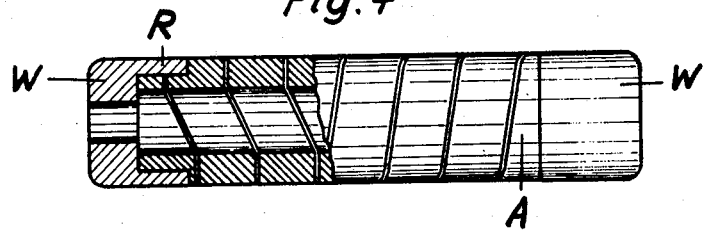
Figure 5:
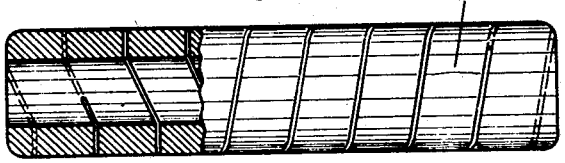

In the accompanying drawings a construction embodying the invention is shown in section in Fig. 1 and a detail in Fig. 2. Figs. 3, 4 and 5 are elevations, partly sectional, of the aforementioned modified construction of the roller bodies.

The spring rollers A formed by winding band steel are all made to accurate length and then their edges rounded off with a radius of about 3 mm.; they are then either placed one behind the other like a chain with links or connected to form a roller cage. The internal and external bushes D, K are about 1 mm. shorter than the spring rollers A. The thrust rings C, E, I, L are made wider than the connection of the spring rollers projects, and they are rounded off correspondingly at their inner side. Assembly of the bearings is effected in the following manner. The thrust ring C with a driving fit is first slipped on the reduced axle journal so that it bears against the shoulder, whereupon the elastic liner bush D with the thrust ring E is mounted. These parts C, D, E are firmly secured by a tightening disc F and the screws G, the end of the axle journal being provided with a tapped hole for this purpose. The bearing housing is fitted with a similar lining, only the thrust ring being omitted. After slipping the roller body chain or the cage A on the lined axle journal, it is introduced into the bearing in the direction of the arrow, upon which the thrust ring L is mounted which, together with the elastic external bush K and the thrust ring I, is secured by the cover M by means of the screws N.

The same result would be achieved by omitting the thrust rings C, E, I, L and increasing the length of the elastic bushes D and K correspondingly and then working them out on the lathe so that the required thrust races are formed from both sides as with the thrust rings. The assembly of such an arrangement would hardly be more difficult than in the case of the example shown in the drawing as the elastic bushes D and K are put on or assembled with a spring 5 mm.; hence it would be possible to introduce the roller body chain or cage prior to the assembly of these bushes.

To provide for as perfect a distribution as possible of the lubricating medium for the bearing, the steel band, which is employed for making the elastic bushes is provided laterally with small grooves arranged at intervals S, as shown in Fig. 2, through which the lubricating medium can enter the bearing sieve-like from the channels O and P. A transverse bearing with supplementary action of a longitudinal bearing is thus provided in the simplest manner so that the troublesome construction of a double bearing is eliminated; moreover, the length of the bearing thus freed can be utilized for lengthening the rollers, thereby increasing in a corresponding degree the supporting capacity and with it the durability.

According to Fig. 3, the roller A is provided at the ends with special heads W which engage at this point with the inside of the rollers A by means of a pin V. Inversely these heads W can of course reach over the correspondingly reduced ends of the rollers A by means of a cap piece R as shown in Fig. 4. Finally the convolutions forming the ends of the rollers are welded together solidly at the ends of the rollers as shown in Fig. 5 by the dotted continuation of the spiral winding, these ends being correspondingly machined. In every case rigid peripheral faces are obtained in this manner at the ends of the rollers for satisfactory rolling action and also for taking the axial forces without impairing the spring of the rollers which plays such an important part in this connection.

What I claim is:

A roller journal bearing comprising a box and a journal having their opposing surfaces provided with relatively narrow annular members and helically wound rollers of band steel having their convolutions spaced apart to provide clearance therebetween, said rollers being arranged between the said opposing relatively narrow annular members and engaging said relatively narrow annular members from end to end of said rollers and serving by reason of their spaced convolutions to absorb axially directed shocks occurring between the peripheral faces of the rollers, the outer peripheral faces of the relatively narrow annular members around the journal and the inner peripheral faces of the relatively narrow annular members in the box, the convolutions forming the ends of said rollers being welded together to provide said rollers with solid inelastic ends.

HEINRICH BECKER.